May 5, 1953 W. G. PATRIQUIN 2,637,414
SHOCK ABSORBER
Filed Aug. 31, 1951
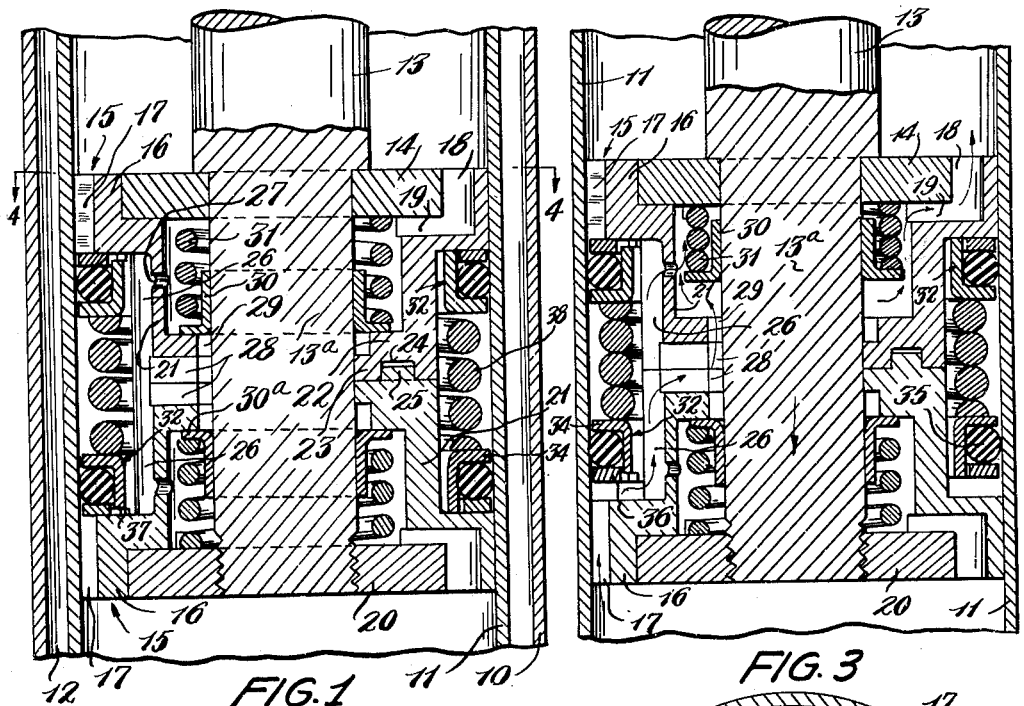
FIG. 1
FIG. 3
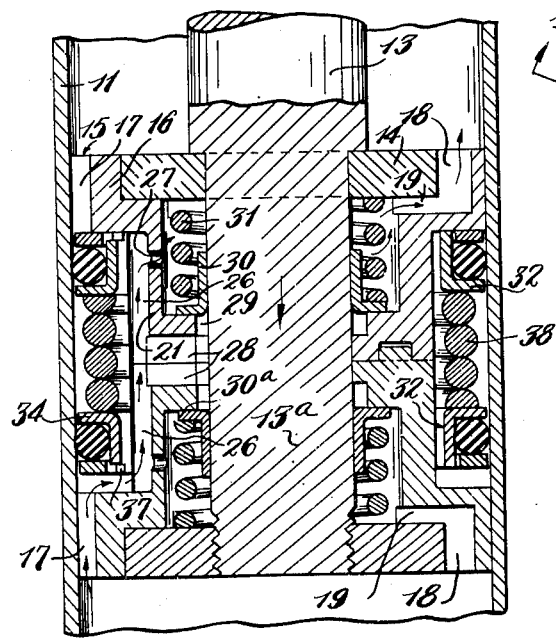
FIG. 2
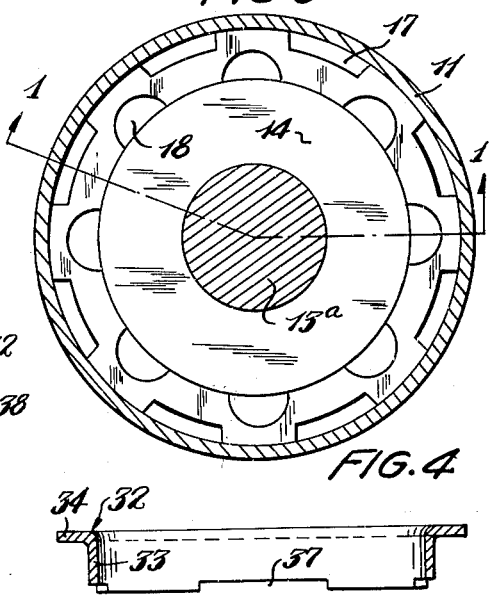
FIG. 4
FIG. 5
INVENTOR.
WILLIAM G. PATRIQUIN
BY Hudson, Boughton,
Williams, David & Hoffmann.
ATTORNEYS Patented May 5, 1953

2,637,414

UNITED STATES PATENT OFFICE 2,637,414

SHOCK ABSORBER

William G. Patriquin, Cleveland, Ohio, assignor to The Gabriel Company, Cleveland, Ohio, a corporation of Ohio Application August 31, 1951, Serial No. 244,512

4 Claims. (Cl. 188—100)

This invention relates to a shock absorber and particularly to a fluid shock absorber. Although the invention is applicable to various types of fluid shock absorbers, it is illustrated and explained herein by way of example as embodied in a direct double-acting hydraulic shock absorber of the general type shown in my Patent 2,507,267 issued May 9, 1950.

An object of the invention is to provide a shock absorber construction wherein the life of the shock absorber is increased in that the load and wear, as the piston of the shock absorber reciprocates in the working cylinder, is distributed between the O rings serving the dual function of piston packings and valves, each O ring functioning respectively during piston movement in one direction.

A further object is to provide a shock absorber which is quiet in operation due to the use in the piston of two valves in series controlling the flow of hydraulic medium through the piston as the latter moves in the working cylinder, said valves in series providing for a drop in pressure of the hydraulic medium intermediate the valves to obviate likelihood of hissing or other noises as the medium passes through the piston.

A still further object is to provide a shock absorber having increased control for obtaining the desired shock absorber characteristics and accomplished by the use of two valves in series for controlling the flow of hydraulic medium through the piston as it moves in opposite directions in the working cylinder. In addition, the construction increases the control of the shock absorber characteristics due to the wide range of "bleeding" provided for in the construction.

Another object of the invention is to provide an improved and novel shock absorber construction which can be economically manufactured due to the symmetrical parts used in the piston.

Further and additional objects and advantages not hereinbefore specified will become apparent hereinafter during the detailed description of an embodiment of the invention which is to follow and which embodiment is illustrated in the accompanying drawing wherein:

Fig. 1 is a fragmentary longitudinal sectional view through a shock absorber embodying the invention and is taken substantially on line 1—1 of Fig. 4 looking in the direction of the arrows, the valves in the piston all being shown closed;

Fig. 2 is a view similar to Fig. 1 but illustrating the opening during the impact stroke of the piston of the first of the two valves arranged in series on the piston;

Fig. 3 is a view similar to Fig. 2, but shows both of the series-arranged valves controlling the flow of oil through the piston on the impact stroke as having moved to open position;

Fig. 4 is a transverse sectional view taken substantially on line 4—4 of Fig. 1 looking in the direction of the arrows, and Fig. 5 is a detailed sectional view of the carrier for the O rings.

As already stated, the shock absorber may be of the general type shown in my issued Patent 2,507,267 and it is so illustrated herein. This type of shock absorber comprises an outer casing and inner working cylinder concentric with the outer casing and spaced therefrom to provide a reservoir therebetween. The lower end of the working cylinder is closed but is in communication with the reservoir through suitable valving, fixed orifices, or the like well understood in the art and not illustrated herein since it forms no part of the present invention. A piston reciprocates in the working cylinder and is connected to a piston rod which extends through a closure at the upper end of the working cylinder and outwardly of the casing as is well understood in the art. The lower end of the shock absorber is provided with an attaching eye, while the upper end thereof has an attaching eye secured to the end of the piston rod. It will be understood that the shock absorber is mounted upon a motor vehicle by having the eyes positioned upon mounting pins or trunnion rods connected respectively to the frame and axle of the vehicle wherefor relative movement between the frame and axle produces relative reciprocation between the piston and the working cylinder and outer casing.

Referring to Fig. 1 the outer casing of the shock absorber is indicated at 10, while the working cylinder thereof is shown at 11, it being understood that the inter-connection between the casing and cylinder and the closure for the opposite ends of these members may take the form shown in my said Patent 2,507,267. The space between the casing 10 and working cylinder 11 indicated at 12 constitutes a reservoir for the hydraulic medium or oil with which the working cylinder is filled. The piston rod is indicated at 13 and has a reduced inner end 13a on which the piston is mounted. The piston embodies the present invention and its construction will now be described in detail.

The piston comprises a disk 14 which interfits the reduced end 13a of the piston rod so as to be movable thereon up against the shoulder formed on the piston rod at the upper end of the reduced portion 13a thereof as viewed in the drawings. The disk 14 has a circular periphery and is of substantially less diameter than the internal diameter of the working cylinder 11. Two symmetrical piston members indicated generally at 15 are mounted on the reduced portion 13a of the piston rod in reverse arrangement. The members 15 comprise an end cup-shaped portion 16 with said portion of the upper member 15 as viewed in the drawing facing the upper end of the shock absorber while said portion of the lower member 15 faces the opposite end of the shock absorber. The cup-shaped portions 16 of the two members 15 are of such external diameter as to slidably interfit with the interior of the working cylinder 11. The cup-shaped portions 16 on their peripheries are provided with a plurality of circularly spaced axially extending and circularly elongated grooves 17 which, with the inner wall of the working cylinder 11, provide passageways for the flow of oil therethrough. The cup-shaped portions 16 also are provided on their interior circumferences with a plurality of circularly spaced axially extending grooves 18 which are staggered relative to the grooves 17 as clearly indicated in Fig. 4. The grooves 18 at their inner ends communicate with radial grooves 19 formed in the bottoms of the cup-shaped portions 16. The disk 14 interfits the interior of the cup-shaped portion 16 of the upper member 15 as does also a disk 20 with respect to the cup-shaped portion 16 of the lower member 15 and which disk 20 is screwed onto the threaded lower end of the reduced portion 13a of the piston rod. It will be understood that the grooves 18 and 19 with the disks 14 and 20 provide passageways extending from the opposite sides of the piston to the central part of the members 15 now to be described.

The members 15 inwardly of the cup-shaped portions 16 thereof are provided with sleeve portions 21 of reduced diameter so that the outer circumference of the sleeve portions is spaced radially inwardly from the inner surface of the working cylinder 11. The sleeve portions 21 of the members 15 abut each other in end-to-end relationship and at their abutting ends are provided with inwardly extending shoulders 22 from which radially and inwardly project a plurality of circularly spaced lugs 23 which engage the reduced portion 13a of the piston rod. The abutting ends of the members 15 are provided with cooperating recesses 24 and pins 25 which interengage and hold the members in proper assembled relationship, one set of said recesses and pins being shown in the drawings. The sleeve portions 21 of the members 15 are provided on their circumferences with axially extending circumferentially spaced grooves 26 which are circumferentially aligned with the grooves 17 on the periphery of the cup-shaped portion 16. The grooves 26 of one member 15 are axially aligned with corresponding grooves 26 on the other member 15. A "bleed" opening 27 is provided in the wall of each sleeve portion 21, and is located in a groove 26, it being understood that, if desired, additional bleed openings might be provided. The adjacent ends of the members 15 are provided with a plurality of circularly spaced radially extending grooves 28 which communicate with the grooves 26 and alternate with the lugs 23. Hence the grooves 28 are in communication with the interiors of the sleeve portions 21 of the members 15 by a plurality of axially extending passages 29 defined by the exterior of the reduced portion 13a of the piston rod and by the lugs 23 and the inner circumferences of the shoulders 22 of the member 15. Sleeve-like valves 30 are slidable on the reduced portion 13a of the piston rod within the sleeve portions 21 of the members 15 and said sleeve-like valves have radially outwardly extending flanges 30a which seat against the shoulders 22, it being noted that when said sleeve-like valves 30 have their flanges 30a seated as just referred to, said valves close communication through the passages 29 with the interior of the sleeve portions 21. Coil springs 31 abut the inner sides of the disks 14 and 20 and the flanges 30a of the sleeve valves 30 and normally maintain said valves seated. It will be understood that different strength springs 31 may be used as desired to obtain different shock absorber characteristics.

Carriers 32 are slidable on the sleeve portions 21 of the members 15 and said carriers have axially extending portions 33 which slide on the members 15 and radially extending portions 34. The carriers 32 mount O rings 35 which bear against the radial arms 34 of the carriers and also against rigid rings 36, it being noted that the O rings 35 are located between the radial portions 34 of the carriers and the rigid rings 36. The free ends of the axial portions 33 of the carriers 32 are provided with a plurality of circularly spaced and circularly extending recesses 37 while said rigid rings 36 fit upon the exteriors of the axial portions 33 of the carriers 32. A coil spring 38 surrounds the portions 21 of the members 15 and has its opposite ends abutting against the radially extending portions 34 of the carriers 32, wherefor said spring 38 functions to maintain both carriers, O rings and rigid rings seated against the shoulders provided by the cup-shaped portions 16 of the members 15 and in a position wherein the O rings 35 seal the piston as a piston packing and close off passage of oil through the grooves 17 on the periphery of the cup-shaped portions 16 of the members 15. The spring load imposed by the spring 38 is predetermined to suit different shock absorber characteristics desired and the springs 38 and 31 will be correlated as to relative strengths to produce predetermined shock absorber characteristics, it being understood that in some instances the spring 31 may produce a greater load than the spring 38 and vice versa, according to the characteristics desired.

Assuming that the piston commences to move on the impact stroke, i. e., the down stroke, from the position shown in Fig. 1 to the position shown in Fig. 2, pressure will be built up in the working cylinder beneath the piston and this pressure will act on the lower rigid ring 36, the lower O ring 35 and the lower carrier 32. At first the pressure acting on the lower rigid ring 36 may simply compress the lower O ring 35, moving the rigid ring slightly, wherefor there will be a slight "bleed" of oil from the lower set of passages 17 beneath the lower rigid ring 36 through the recesses 37 of the carrier and into the grooves 26, from whence it can flow to the opposite or upper side of the piston through the "bleed" opening 27 in the upper member 15. As the pressure beneath the piston increases beyond the load of the spring 38 the lower rigid ring 36, lower O ring 35 and lower carrier 32 will move axially upwardly relative to the piston from the position shown in Fig. 1 to the position shown in Fig. 2, thus permitting a relatively free flow of oil from beneath the piston through the lower set of peripheral grooves or passages 17 and into the axially extending grooves 26 of the sleeve portions 21 of the members 15. The oil thus flowing into the grooves 26 can "bleed" through the upper "bleed" opening 27 to the other side of the piston as indicated by the arrows in Fig. 2. As soon as the pressure of the oil in the axial grooves 26 and in the radial grooves 28 and the axial grooves 29 reaches the point where it overcomes the load of the upper spring 31, the upper sleeve valve 30 moves from its seat as shown in Fig. 2 to the position shown in Fig. 3, at which latter time a relatively free flow of oil occurs from one side of the piston to the other, said flow being indicated by the arrows in Fig. 3. It will be understood that at this time the lower sleeve valve 30 remains seated, inasmuch as it is held against its seat by the load of the lower spring 31 and the pressure of the oil in the working cylinder beneath the piston. It will be understood that the operation of the valves, i. e. the lower O ring 35, and the upper sleeve valve 30 during the downward or impact stroke of the piston is similar to the order of operation of the upper O ring 35 and the lower sleeve valve 30 during the upward or recoil stroke of the piston and therefore detailed description of the order and mode of operation of these valves during the recoil stroke need not be set forth in detail.

From the explanation thus far given, it will be seen that various shock absorber characteristics for both the impact and recoil strokes of the piston can be obtained by using predetermined relative strengths with respect to the springs 31 and 38. Also the spring 31 of the upper sleeve valve 30 may be of a different strength than the spring 31 for the lower sleeve valve 30 to get different operative characteristics for the impact and recoil strokes. In addition, it will be apparent that a wide range of "bleed" may be obtained by varying the size and the number of the "bleed" openings 27. Inasmuch as each O ring valve and its cooperating sleeve valve are arranged in series and successively function, an expansion space is provided between such valves which produces a reduction in pressure of the oil flowing from one side of the piston to the other side thereof and hence lessens any hissing noise occasioned by the flowing oil and provides for a more quietly operating shock absorber. It will also be observed that the members 15 are symmetrical and hence the piston can be assembled from any two members 15 together with the identical carriers 32, O rings 35, rigid rings 36 and sleeve valves 30. This produces a shock absorber which can be economically manufactured and assembled.

Although a preferred embodiment of the invention has been illustrated and described herein, it will be understood that the invention is susceptible of various modifications and adaptations within the scope of the appended claims.

Having thus described my invention, I claim:

1. In a fluid shock absorber of the character described, a working cylinder and a piston reciprocable therein and comprising a piston body formed of a pair of symmetrical members arranged in reverse relationship to each other and having portions spaced apart longitudinally of the cylinder and slidable therein, said members having sleeve portions intermediate the first-named portions and abutting each other and spaced radially inwardly from said working cylinder to provide an intermediate annular space, a piston rod passing through said members, means on said rod securing said members in assembled relationship thereon, said first-mentioned portions of said members being provided on their peripheries with longitudinally extending grooves communicating with said intermediate space and with the working cylinder at the opposite sides of the piston, primary valve means movable on said sleeve portions, spring means acting on said primary valve means to normally maintain the same seated against said first-mentioned portions to close said peripheral passages, passages in said sleeve portions extending from the said intermediate space to the interiors of said sleeve portions, secondary valve means within said sleeve portions, and independent spring means acting on said secondary valve means to maintain the same seated to close said last-mentioned passages.

2. A shock absorber as defined in claim 1 and wherein said primary valves comprise carriers having cylindrical portions slidable on the sleeve portions of said members and provided with radially outwardly extending flanges, O-rings on said carriers, while said first named spring means comprises a single coil spring located in said intermediate space and surrounding said sleeve portions of said members and having its opposite ends abutting the flanges of said carriers.

3. A shock absorber as defined in claim 1 and wherein said secondary valve means comprises a sleeve-like valve member within the sleeve portion of each of said symmetrical members and slidable on said piston rod and provided with a radial flange.

4. A shock absorber as defined in claim 1 and wherein said sleeve portions of said symmetrical members are provided on their circumferences with circularly spaced longitudinally extending grooves, said sleeve portions each being provided with a bleed opening located in one of said grooves and communicating with the interior of the sleeve portion beyond the secondary valve means therein.

WILLIAM G. PATRIQUIN.

References Cited in the file of this patent

UNITED STATES PATENTS

| Number | Name | Date |
| --- | --- | --- |
| 2,225,986 | Glezen | Dec. 24, 1940 |
| 2,379,750 | Rossman | July 3, 1945 |
| 2,497,972 | Beecher | Feb. 21, 1950 |